(12) United States Patent
Sheikh et al.

(10) Patent No.: US 8,954,271 B2
(45) Date of Patent: Feb. 10, 2015

(54) METHOD AND SYSTEM FOR DETERMINING RELATIVE DISPLACEMENT AND HEADING FOR NAVIGATION

(75) Inventors: Suneel Ismail Sheikh, Shoreview, MN (US); Darryll J. Pines, Clarksville, MD (US); Joseph Kim Conroy, Hyattsville, MD (US); Timofey N. Spiridonov, Bethesda, MD (US)

(73) Assignee: The University of Maryland, College Park, College Park, MD (US)

( * ) Notice: Subject to any disclaimer, the term of this patent is extended or adjusted under 35 U.S.C. 154(b) by 402 days.

(21) Appl. No.: 13/508,070

(22) PCT Filed: Nov. 8, 2010

(86) PCT No.: PCT/US2010/055813
§ 371 (c)(1),
(2), (4) Date: Oct. 25, 2012

(87) PCT Pub. No.: WO2011/057182
PCT Pub. Date: May 12, 2011

(65) Prior Publication Data
US 2013/0040656 A1 Feb. 14, 2013

Related U.S. Application Data
(60) Provisional application No. 61/258,973, filed on Nov. 6, 2009.

(51) Int. Cl.
*H04W 4/02* (2009.01)
*G01S 5/02* (2010.01)
*G01C 22/00* (2006.01)

(52) U.S. Cl.
CPC ................. *G01S 5/02* (2013.01); *G01C 22/006* (2013.01); *G01S 5/0284* (2013.01); *G01S 5/0294* (2013.01)
USPC ........................................................ 701/494

(58) Field of Classification Search
USPC ........................................................ 701/494
See application file for complete search history.

(56) References Cited

U.S. PATENT DOCUMENTS

| | | | |
|---|---|---|---|
| 4,371,945 A | 2/1983 | Karr et al. | |
| 5,287,628 A * | 2/1994 | Yamaguchi et al. | 33/361 |
| 5,335,915 A | 8/1994 | Baudier | |
| 6,234,982 B1 | 5/2001 | Aruin | |
| 6,647,352 B1 * | 11/2003 | Horton | 702/151 |
| 6,658,079 B1 | 12/2003 | Macklin et al. | |
| 6,813,582 B2 * | 11/2004 | Levi et al. | 702/141 |

(Continued)

FOREIGN PATENT DOCUMENTS

| | | |
|---|---|---|
| JP | 10-307985 A | 11/1998 |
| JP | 2008-281494 A | 11/2008 |
| JP | 2009-75036 A | 4/2009 |

*Primary Examiner* — Thomas Tarcza
*Assistant Examiner* — Alex C Dunn
(74) *Attorney, Agent, or Firm* — Sughrue Mion, PLLC

(57) ABSTRACT

A system and method for determining a location of a mobile object is provided. The system determines the location of the mobile object by determining distances between a plurality of sensors provided on a first and second movable parts of the mobile object. A stride length, heading, and separation distance between the first and second movable parts are computed based on the determined distances and the location of the mobile object is determined based on the computed stride length, heading, and separation distance.

6 Claims, 9 Drawing Sheets

(56) References Cited

U.S. PATENT DOCUMENTS

| | | |
|---|---|---|
| 6,876,903 B2 | 4/2005 | Takenaka |
| 7,103,471 B2 * | 9/2006 | Levi et al. ............ 701/494 |
| 7,177,779 B2 * | 2/2007 | Hikida et al. ............ 702/150 |
| 8,090,535 B2 * | 1/2012 | Sato et al. ............ 701/508 |
| 2004/0095276 A1 | 5/2004 | Krumm et al. |
| 2009/0071805 A1 | 3/2009 | Horning et al. |
| 2009/0073045 A1 | 3/2009 | Supino et al. |
| 2009/0326795 A1 * | 12/2009 | Supino et al. ............ 701/200 |

* cited by examiner

METHOD AND SYSTEM FOR DETERMINING RELATIVE DISPLACEMENT AND HEADING FOR NAVIGATION

CROSS-REFERENCE TO RELATED PATENT APPLICATION

This application claims priority from U.S. Provisional Application No. 61/258,973 filed on Nov. 6, 2009, the disclosure of which is incorporated herein by reference in their entirety.

STATEMENT REGARDING FEDERALLY SPONSORED R&D

This invention was made with government support under NNX08AF14G awarded by Department of Homeland Security (through NASA). The government has certain rights in the invention.

BACKGROUND

1. Technical Field

Apparatuses and methods consistent with the present disclosure relate to navigation systems capable of providing highly accurate location information.

2. Description of the Related Art

Personal navigation systems capable of providing highly accurate location information are sought after for various applications. For example, personal navigation system that can be used in global positioning system (GPS) denied environments or GPS-disrupted environments are sought after for military, first responder, and consumer applications. There is a need for personal navigation systems suitable for environments in which there is line-of-sight blockage (e.g., buildings, forest canopy, caves, etc.) and/or electrical interference/jamming. Also, such personal navigation systems can be used in clinical research to accurately measure motion of patients during therapy.

Conventional personal navigation systems use an inertial measurement unit (IMU), or some subset of inertial sensors, to measure changes in position and heading to track the movement of a person, ground vehicle, or air vehicle. These systems can also use digital pedometers that measure the impact strike of each foot and use an average stride length to compute distance traveled. These pedometers use small accelerometers to measure when each foot hits the ground. Many IMUs incorporate magnetometers for determining heading or direction using the Earth's magnetic field. However, these measurements are often corrupted inside buildings or structures due to the presence of magnetically interfering iron or electromagnetic fields.

US 20090326795 provides an example of a related art personal navigation system. A stride vector technique is presented for a pair of first and second objects, such as a pair of boots or shoes worn by a user and integrated with a personal navigation system for the user. Using the stride vector technique, a position vector is measured between user's two feet by using information gathered by sensors disposed on each foot.

SUMMARY

Exemplary embodiments of the present disclosure address at least the above problems and/or disadvantages and other disadvantages not described above. Also, the present disclosure is not required to overcome the disadvantages described above, and an exemplary embodiment of the present disclosure may not overcome any of the problems listed above.

Exemplary implementations of the present disclosure provide a novel technique for measuring and collecting data, which can be used in the accurate determination of distance and direction traveled by an object such as an individual.

According to an exemplary implementation of the present disclosure a plurality of sensors are placed upon an individual's feet (both right and left). These sensors operate either/both as transmitters or receivers that directly measure the distance, or displacement, between nodes on each foot in a continuous manner. A unique algorithm is presented that uses this sensor displacement data to compute the accurate step or stride length between feet, the heading or direction of one foot relative to the other, and vertical or altitude, displacement of one foot relative to the other.

BRIEF DESCRIPTION OF THE DRAWINGS

The above and other features and advantages of the present disclosure will become more apparent by describing in detail exemplary implementations thereof with reference to the attached drawings in which.

DETAILED DESCRIPTION

Exemplary implementations of the present disclosure will now be described more fully with reference to the accompanying drawings.

Figure 1:
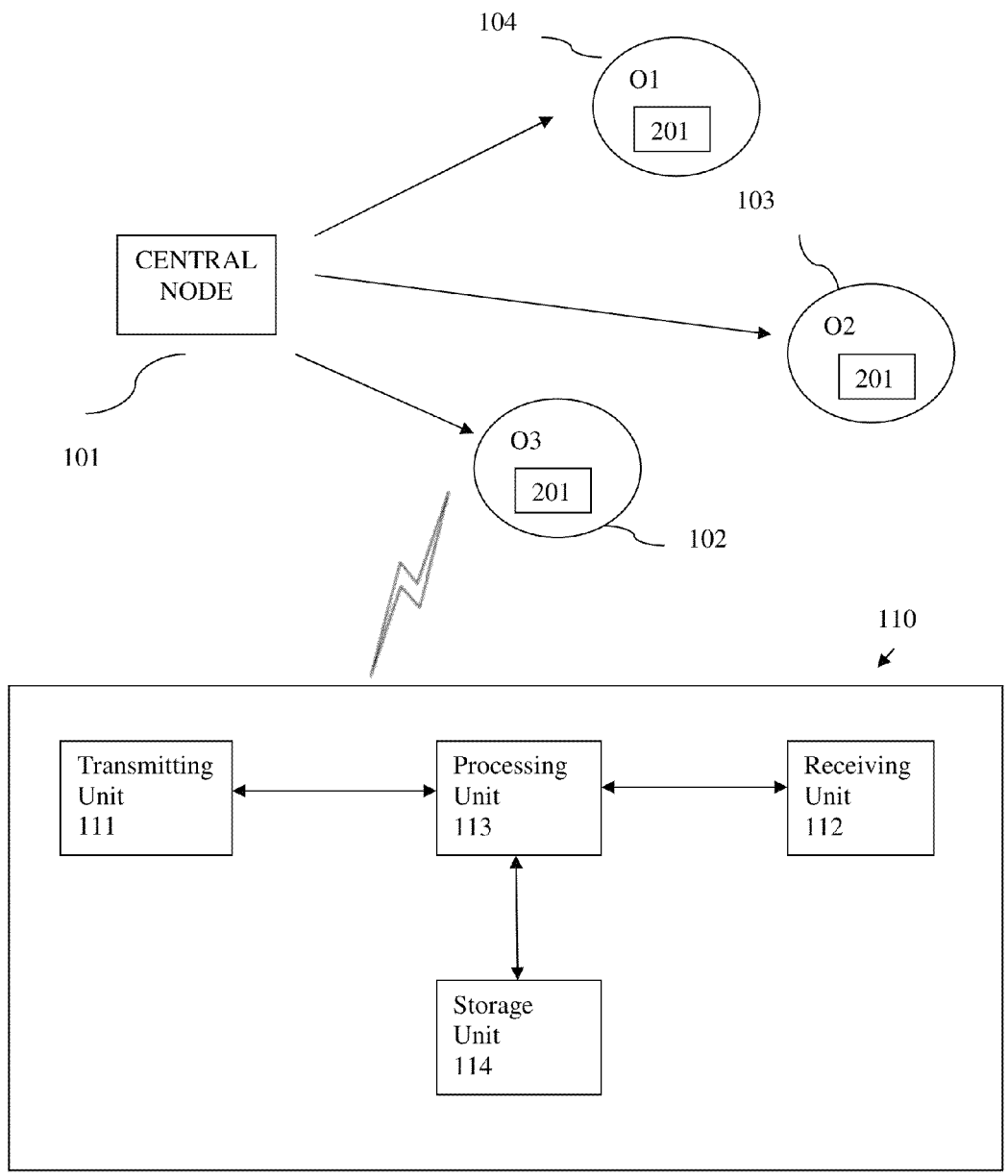
FIG. 1 illustrates an exemplary system for determining location of a mobile object.

FIG. 1 illustrates an exemplary system in which a central node 101 determines a location of mobile objects 102, 103, and 104. The central node 101 may be implemented on a processor. The central node 101 communicates with sensors 201 installed on each of the moving objects 102, 103, and 104 to determine their position with respect to the central node's frame of reference. It is also possible that the mobile objects communicate with each other to determine each other's relative position. The central node 101 can correspond to a processor located at a fiducial point (such as an entrance to a building). The communication between the central node 101 and the mobile objects may be carried out through a wireless medium such as Bluetooth, RF, optical, etc. According to an exemplary implementation, a controller 110 communicates with each of the plurality of sensors 201 on a mobile object and communicates certain measurements to the central node. As an example, each of the mobile nodes 102, 103, and 104 may be provided with a controller 110 that gathers data from sensor nodes on a mobile object, determines certain information from the gathered data, and communicates the certain information to the central node. The controller may be implemented on a processor and may include a transmitting unit 111, a receiving unit 112, a processing unit 113, and a storage unit 114. The transmitting unit 111 transmits data to the central node. The receiving unit 112 receives data from the sensor nodes. The processing unit 113 processes the received information and generates the information to be sent to the central node. The storage unit 114 stores information predetermined for the system and also stores intermediate results.

The central node may also be placed directly on the individual's or object's parts so that the relative movement of the mobile objects may be determined. The central node may contain a clock to maintain synchronization of transmitted data between all remote nodes.

Figure 2:
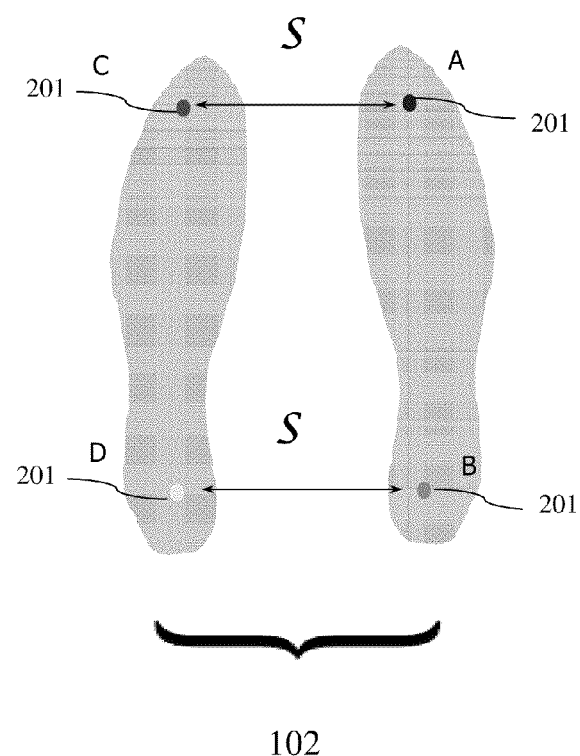
FIG. 2 illustrates an exemplary sensor configuration for an exemplary mobile object.

To describe in detail the exemplary system of FIG. 1, an exemplary sensor configuration is described in FIG. 2, in which the objects 102, 103, and 104 correspond to first responders such as firefighters. It should be noted that individuals such as first responders are only examples of objects and the location information of any mobile object can be accurately determined by the system of FIGS. 1 and 2. For example, the mobile object could be a robot on which wireless sensors are disposed for communication with a central node. As another example, the mobile objects could be friends or co-workers that seek location information of others within a social-networking environment.

FIG. 2 illustrates a group of sensors 201 (A, B, C, and D) installed on a mobile object 102. In the case of FIG. 2, the group of sensors 201 are installed on a right and left boot of a first responder. In FIG. 2, 's' corresponds to a separation distance between the two feet of a first responder. The group of sensors may communicate with each other through a wireless medium and determine a distance between each other. Alternatively, the controller 110 may be provided on the mobile object that calculates the distance between each of the sensors 201. Such a controller 110 may be installed in a plurality of locations on the mobile object. For example, the controller may be installed on one of the boots, it may be strapped to the body of the first responder, or one of the sensors itself may function as the controller. It should be noted that the above examples are only for purposes of illustration and many such implementations will be apparent to one of ordinary skill in the art.

Figure 3:
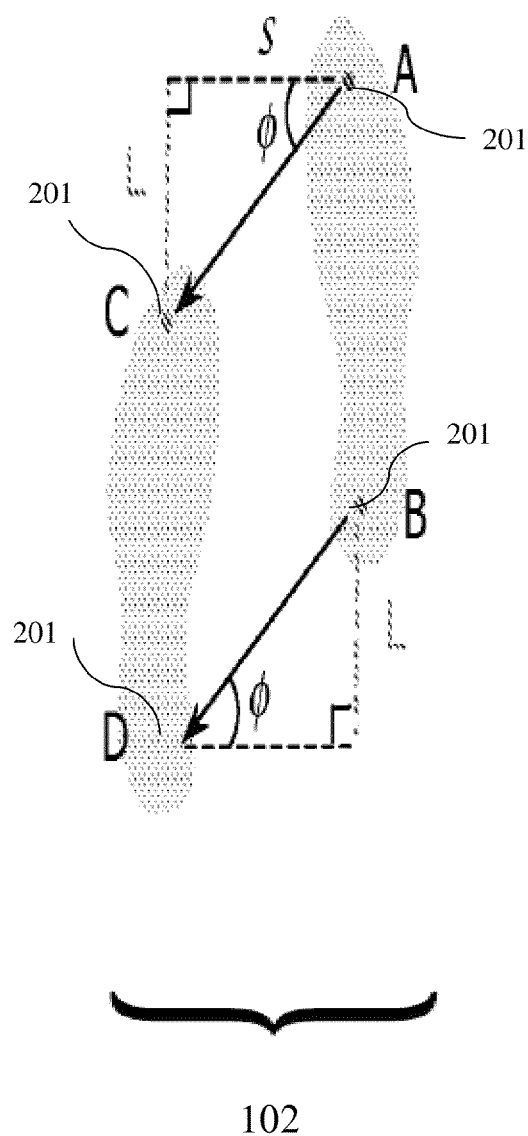
FIG. 3 illustrates an exemplary technique for measuring a stride length.

Next, an exemplary technique is illustrated with reference to FIG. 3 using which a location of a first responder can be determined. If it is assumed that a distance between the feet of a first responder remains the same when he moves in a straight line, then a stride length 'L' can be calculated as follows:

$$\phi = \arccos\left(\frac{s}{r_{AC}}\right)$$

$$\phi = \arccos\left(\frac{s}{r_{BD}}\right)$$

then $$L = r_{AC} \sin(\phi)$$

$$L = r_{BD} \sin(\phi)$$

Alternatively, 'L,' can also be calculated using:

$$L = \sqrt{r_{AC}^2 - s^2}$$

$$L = \sqrt{r_{BD}^2 - s^2}$$

The above calculation assumes that 's' is known. The value of 's' can be determined by prior experimentation and the values $R_{AC}$ and $R_{BD}$ can be calculated by the controller. Accordingly, the stride length 'L' can be determined.

Figure 4:
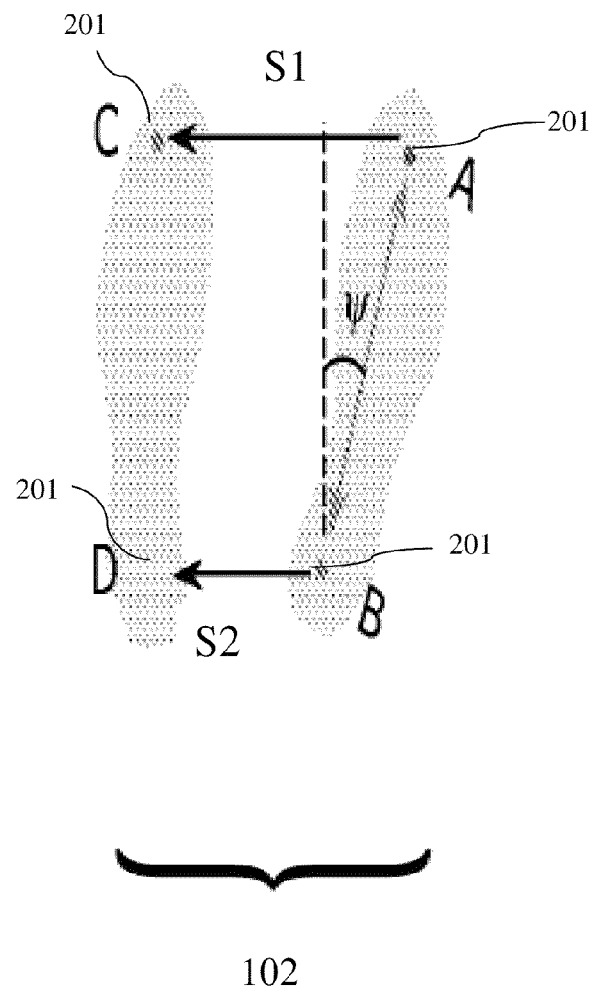
FIG. 4 illustrates an exemplary technique for measuring a heading.

FIG. 4 illustrates another exemplary technique in which a relative foot rotation can be determined while a first responder is in a standing position. The relative rotation of $R_{AB}$ is determined as the heading of the right foot with respect to the left foot. If the heading is non-zero, then the stride separation between the heels will not equal the stride separation between the toes.

In FIG. 4, the controller determines the heading $\psi$ by determining $R_{AB}$ (distance between sensors on the same foot), $R_{AC}$ and $R_{DB}$.

$$\psi = \arcsin\left(\frac{r_{AC} - r_{BD}}{r_{AB}}\right) \approx \arcsin\left(\frac{r_{AC} - s_2}{r_{AB}}\right)$$

Figure 5:
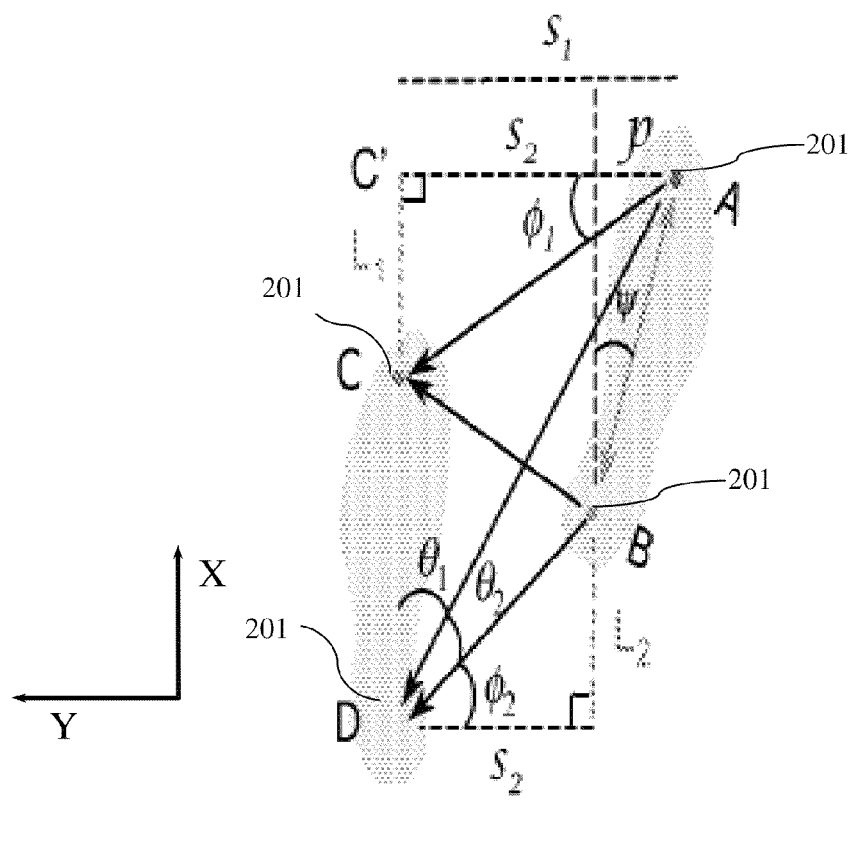
FIG. 5 illustrates an exemplary technique for measuring a stride length, heading, and separation distance.

FIG. 5 illustrates an exemplary technique for determining a stride length and a heading of a first responder. In FIG. 5, the stride length 'L2' is measured based on relative displacement of two sensors B and D, which are provided on the heels of the right and left foot, respectively. The controller measures $R_{AC}$, $R_{BD}$, $R_{AB}$, $R_{BC}$, $R_{AD}$, and $R_{CD}$. Also, $R_{AB}$ and $R_{CD}$ can be directly measured and known prior to operation based upon their initial placement of these nodes in the boots. These are the values which the controller can measure directly. Since the measured values are distances, the notation of distance is independent of the direction, so that $R_{IJ} = R_{JI}$ should be apparent to one skilled in the art. The controller then determines the stride length 'L2' and heading based on the following:

$$r_{BC}^2 = r_{CD}^2 + r_{BD}^2 - 2 r_{CD} r_{BD} \cos(90° - \tilde{\phi}_2)$$

Using the above equation, sin $\phi 2$ can be determined and based on that the stride length 'L2' can be determined as follows:

$$\tilde{L}_2 = \sin(\tilde{\phi}_2) r_{BD}$$

Similarly, 's2' can be calculated:

$$\tilde{s}_2 = \cos(\tilde{\phi}_2) r_{BD}$$

It should be noted that the variables having the 'tilda' sign are the variables which are to estimated or determined. To determine the heading, the following equations are used:

$$\angle ACD = \tilde{\gamma} : r_{AD}^2 = r_{AC}^2 + r_{CD}^2 - 2 r_{AC} r_{CD} [\cos(\tilde{\gamma})]$$

$$\tilde{s}_1 = \sin(\tilde{\gamma}) \cdot r_{AC}$$
$$= \tilde{s}_2 + \tilde{p}$$

$$\psi = \arcsin\left(\frac{p}{r_{AB}}\right) = \arcsin\left(\frac{\tilde{s}_1 - \tilde{s}_2}{r_{AB}}\right)$$

In the above equations, cosine(angle ACD) is computed and based on this computation, 's1' is determined because $R_{AC}$ is measured. Next, 'p' is computed and finally the heading is computed using 'p' and $R_{AB}$.

Figure 6:
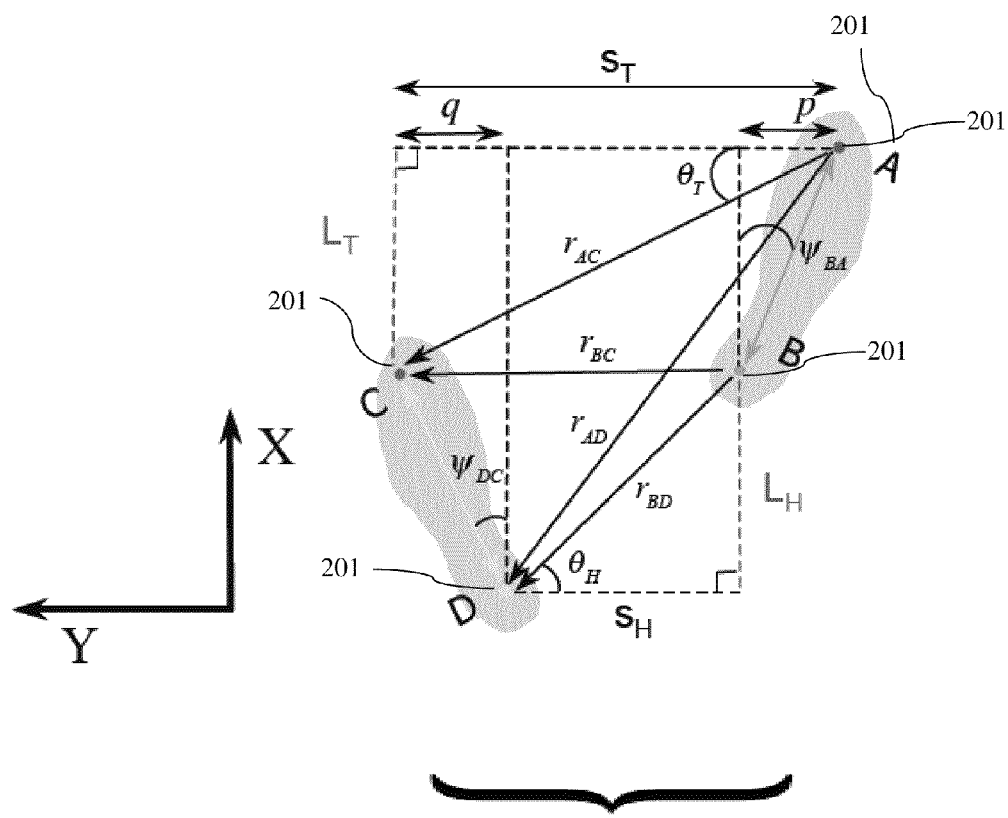
FIG. 6 illustrates another exemplary technique for measuring a stride length, heading, and separation distance in an absolute frame of reference (inertial frame of reference).

According to another exemplary implementation, FIG. 6 illustrates an exemplary technique for determining a stride length and a heading of a first responder. The exemplary implementation of FIG. 6 is an example of determining position of a mobile object (first responder) relative to an inertial frame. Such a 2-dimensional inertial frame may be defined with respect to a fiducial point (such as an entry door, hallway, etc.).

Based on the geometry of FIG. 6, the stride length '$L_H$' is defined as the displacement in the X-direction of the inertial frame. In this particular case, the stride length is measured as the horizontal displacement between the two sensor nodes B and D, which are provided at the heel-end of the first responder boots. It should be noted, that the stride length could also have been defined with respect to sensor nodes A and C, which are provided at the toe end of the boots. The heading $\Psi_{BA}$ is defined as the rotation of the line connecting the two sensors provided on the front foot, with respect to the one of the axes in the inertial frame. The separation distance is defined as '$S_H$', which is the distance between the sensor nodes B and D in the Y-direction of the inertial frame.

The following equations can be derived from FIG. 6:

$$\psi_{BA}(t_k) + \theta_T(t_k) + \theta_{CAB}(t_k) - 90° = 0$$

$$\theta_{CDB}(t_k) - \psi_{DC}(t_{k-1})\theta_H(t_k) - 90° = 0$$

$$\psi_{DC}(t_{k-1}) + \theta_{ACD}(t_k) - \theta_T(t_k) - 90° = 0$$

$$\theta_{ABD}(t_k) - \psi_{BA}(t_k) - \theta_H(t_k) - 90° = 0 \quad (1)$$

As discussed previously, the controller measures $R_{AC}$, $R_{BD}$, $R_{AH}$, $R_{BC}$, $R_{AD}$, and $R_{CD}$. Using the law of cosines, $\theta_{CAB}$, $\theta_{CDB}$, $\theta_{ACD}$, and $\theta_{ABD}$ can be determined. As an example, $$\theta_{ABD} = \arccos\left[\frac{r_{BA}^2 + r_{BD}^2 - r_{AD}^2}{2 r_{BD} r_{BA}}\right]$$

Equations (1) provide a system of three linearly independent equations with four unknowns. Now, assuming that the heading from the previous step (i.e., $\Psi_{PDC}$) is known, only three unknowns ($\Psi_{BA}$, $\theta_T$, and $\theta_H$) are left to be determined. By solving the above four equations, these three unknowns can be easily determined. Once $\Psi_{BA}$, $\theta_T$, and $\theta_H$ are determined, the stride length '$L_H$' and separation distance '$S_H$' can be determined as:

$$L_H = r_{BD} \sin \theta_H$$

$$S_{BD} \cos \theta_H$$

In the above exemplary implementations, the measurements for the stride length and heading can be performed in a continuous manner or based on movement. If the measurements are performed in a continuous manner, the measurements can be made at predetermined time intervals irrespective of whether the object moves. If the measurements are based on movement, the controller can determine a specific moment at which the measurements are conducted. For example, the controller may determine the heading and stride length when one of the feet hits the ground. Also, the controller may determine the heading and stride lengths when the amplitude of the measured node distances reaches a maximum or minimum. The goal of these measurements is to generate a continuous or discrete time history of the movement of the nodes so that the full displacement nodes can be determined as required for a specific application or operation.

The location of a mobile object in the X-Y plane (see FIG. 6) can be determined as follows: based upon heel, with N number of steps, add up stride lengths, '$L_H$' of each step and change in stride width '$S_H$'. Specifically, the x-position y-position can be calculated over N steps using the following equations:

$$x \text{ position} = \sum_{i=1}^{N} L_{H_i} \quad (2)$$

$$y \text{ position} = \sum_{i=1}^{N} (s_{H_i} - s_{H_{i-1}})$$

As indicated above, to calculate the x and the y positions, previous stride lengths and separation distances need to be stored. The storage unit 114 may store these values and the processing unit 113 may calculate the x and the y positions. Further, it is possible that the controller 110 may only calculate instantaneous stride lengths and separation distances and supply these to the central node, which then keeps track of the instantaneous values and determines the x and y positions.

Next, an exemplary technique is described with reference to FIG. 7, in which the stride length, heading, and separation distances are calculated in a reference frame that changes based on the most recent foot fall. With this technique, the relative location of each foot can be determined during each step. However, to get the final location of the mobile object, values from this relative reference frame technique need to be transformed or referenced to a fixed inertial frame. Furthermore, the equations that are described next provide the '$\Psi_{DC}$' that was assumed as known for the equations of FIG. 6.

Figure 7:
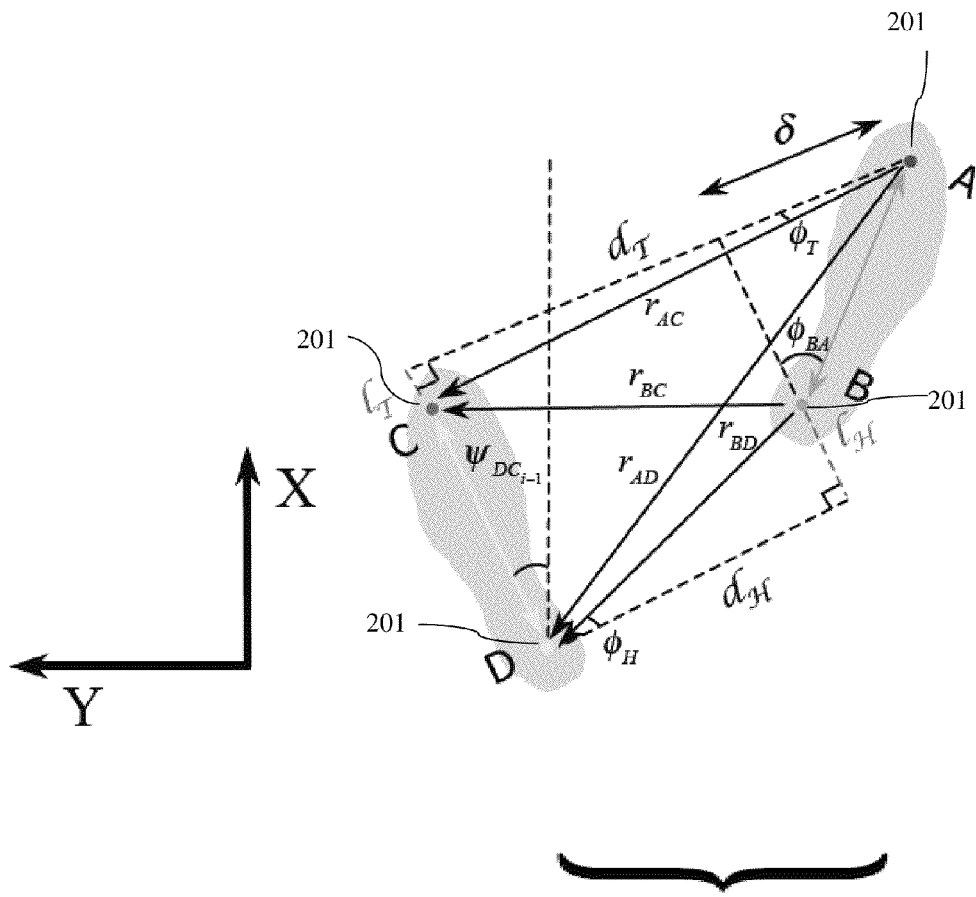
FIG. 7 illustrates another exemplary technique for measuring a stride length, heading, and separation distance in a relative reference frame.

Based on the geometry of FIG. 7, the following equations hold:

$$-\phi_T(t_k) + \theta_{ACD}(t_k) - 90° = 0$$

$$\theta_{CDB}(t_k) + \phi_H(t_k) - 90° = 0$$

The $\theta_{CDB}$, $\theta_{ACD}$ values can be determined similar to FIG. 6. Therefore, the two unknowns $\Phi_T$ and $\Phi_H$ can be determined from the above two equations.

Now, the following values can be readily determined:

$$l_T = r_{AC} \sin \phi_T$$

$$l_H = r_{BD} \sin \phi_H$$

$$d_T = r_{AC} \cos \phi_T$$

$$d_H = r_{BD} \cos \phi_H$$

In FIG. 7, $\Psi_{DC}(i-1)$ is the same as $\Psi_{DC}$ in FIG. 6.

Next, the following two equations define a relationship between $\Phi_T$ and $\Phi_H$, the heading (with respect to the inertial reference frame) of the previous foot step (left foot in this case) and variables $\theta_T$, and $\theta_H$:

$$\psi_{DC} = \theta_T - \phi_T$$

$$\psi_{DC} = \theta_H - \phi_H$$

Using the above two equations, the set of equations (1) can be solved.

The final position of the mobile object can be expressed by:

$$X \text{ position} = \sum_{i=1}^{N} l_{H_i}\left[\frac{\sin(\psi_{DC_{i-1}} + \phi_{H_i})}{\sin \phi_{H_i}}\right] \quad (3)$$

$$Y \text{ position} = \sum_{i=1}^{N} \left\{ d_{H_i}\left[\frac{\cos(\psi_{DC_{i-1}} + \phi_{H_i})}{\cos \phi_{H_i}}\right] - d_{H_i}\left[\frac{\cos(\psi_{DC_{i-2}} + \phi_{H_{i-1}})}{\cos \phi_{H_{i-1}}}\right] \right\}$$

Figure 8:
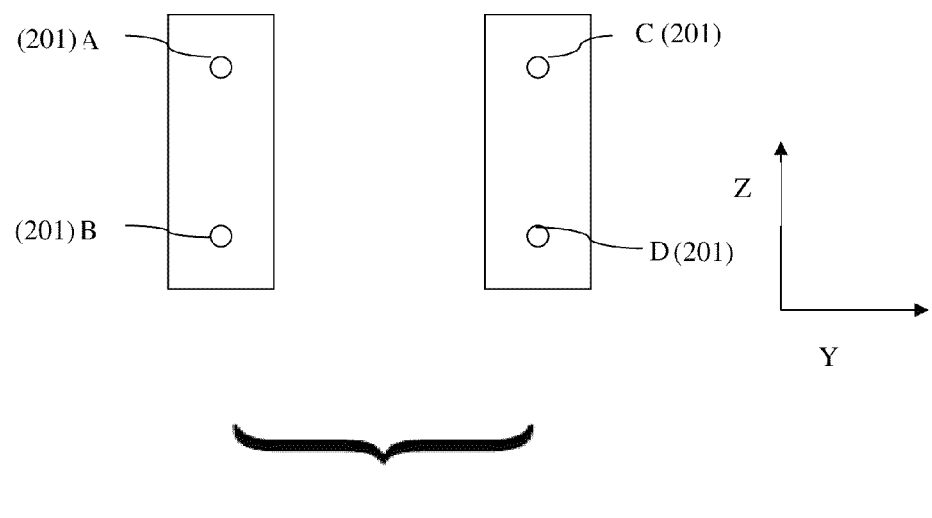
FIG. 8 illustrates a system for extending the techniques for FIGS. 6 and 7 to determine 3-D location.

Techniques similar to those discussed above can be used to determine the 3-D position of a mobile object. Sensors such as A, B, C, D would be placed in a vertical direction, or Z-axis direction, to create vertical ABCD plane as opposed to the horizontal ABCD plane described in FIGS. 2-6. The same solutions as described above with reference to FIG. 6 can now be created in an X-Z or Y-Z plane. By combining the X-Y solutions (FIG. 6) and the X-Z/Y-Z solution, a full three-dimensional solution can be obtained. For purposes of illustration, consider FIG. 8 in which sensors A, B, C, and D are provided on an area of the right and left legs extending from the knee to the ankle. The vertical distance between B and D will correspond to the stride length in the vertical direction and the horizontal distance will correspond to the horizontal displacement in the Y-Z plane.

Figure 9:
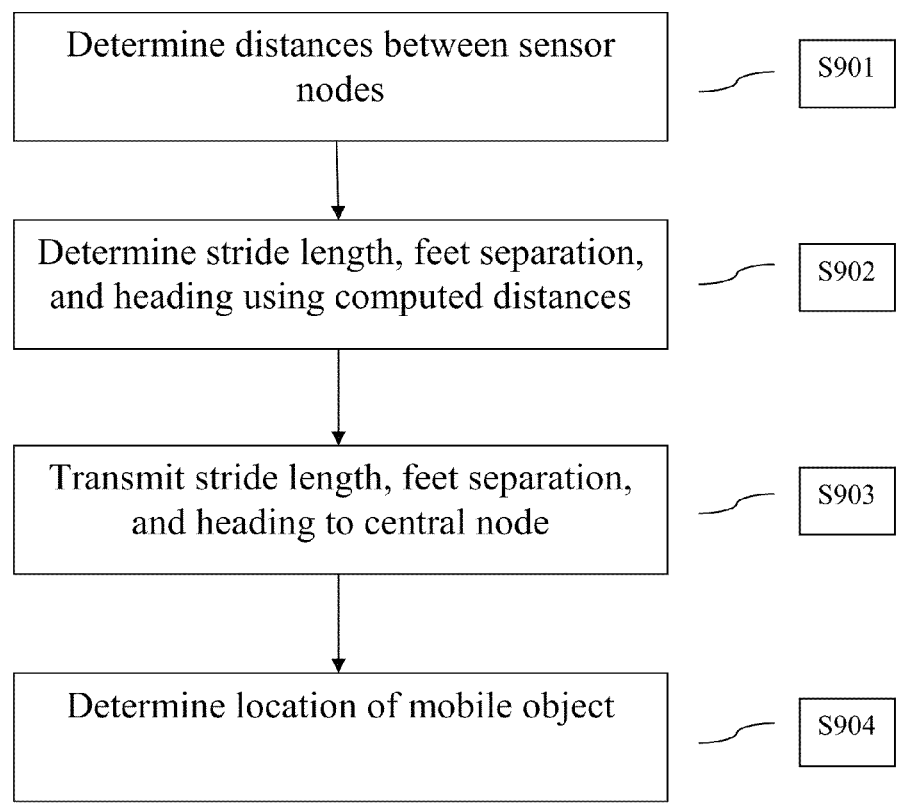
FIG. 9 illustrates an exemplary method for determining a location of a mobile object.

Next, an exemplary method is described for determining the location of a mobile object. The exemplary method will be described in FIG. 9 and will refer to the system and techniques described above. Specifically, the exemplary method is described by referring to FIGS. 1, 2, 6 and/or 7.

In S901, a controller 110 determines distances between sensor nodes placed on moving parts of a mobile object. Assuming that the mobile object is a first responder and the moving parts are his/her left and right feet, the controller 110 measures $R_{AC}$, $R_{BD}$, $R_{AB}$, $R_{BC}$, $R_{AD}$, and $R_{CD}$. These values correspond to the distances between the different sensors (A, B, C, and D) placed on the left and right feet. Also, $R_{AB}$ and $R_{CD}$ (distance between sensors on the same moving part, i.e., same foot in this case) can be directly measured and known prior to operation based upon their initial placement of these nodes in the boots. These are the values which the controller can measure directly.

In S902, the controller 110 determines the stride length, the separation distance between the two feet, and the heading. These values may be calculated based on the assumed frame of reference (relative or absolute). Exemplarily, the values of stride length, separation distance may be determined based on the equations described with reference to FIGS. 6 and 7.

In S903, the controller 110 may store these values in the storage unit 114 or may transmit them to the central node.

In S904, the location of the mobile object is determined using the above calculated values. The location of the mobile object can be determined using equations (2) or (3) described above.

The above exemplary implementations have been described with reference to a mobile object having two mobile parts (right foot and left foot) that move relative to each other. However, this can be extended to more than two mobile parts, for example four moving legs of a walking robot, as long as the proper set of nodes is chosen to represent each of the sets of feet. It should be noted that the above description focused on walking only for the purposes of illustration. These described techniques can be equally applied to any form of locomotion or node movement. Types of locomotion may include walking, running, shuffling, side-to-side walking, crawling, walking up stairs, climbing ladders, etc.

Exemplary implementations of the present disclosure directly support all aspects of personal navigation, including inside and outside of buildings or structures. These exemplary implementations are especially suitable for emergency responding personnel, but are also applicable to any form of personal navigation including tracking astronauts on celestial bodies. Aside from measuring absolute heading and position of an individual, the exemplary implementation allows for a reduced set of measurements that provides distances between nodes that can be directly utilized to determine displacements between parts of an individual's body (e.g. arms, legs, torso), or parts on a robot (e.g. robotic arms, sensor appendages), or parts of other moveable objects on a device.

Exemplary implementation described above with reference to flowchart illustrations and/or block diagrams of methods, apparatus (systems) can be implemented using computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer special purpose computer or other programmable data processing apparatus to produce a machine, such that the instructions, which execute via the processor of the computer or other programmable data processing apparatus, create means for implementing the functions/acts specified in the flowchart and/or block diagram block or blocks. For example, instructions embodied on a computer-readable medium can be executed by a processor to provide the functionality of either the central node, the controller, and the sensor nodes (A, B, C).

More generally, computer program instructions may be stored in a computer readable medium that can direct a computer, or other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A system for determining a location of a mobile object including at least a first and second movable part, the system comprising:
   a central node;
   a controller coupled to the mobile object; and
   a plurality of sensors provided on each of the first and second movable parts,
   wherein:
   the controller is configured to determine distances between the plurality of sensors, and is further configured to determine a stride length, a heading, and a separation distance between the first and second movable parts using the determined distances, and
   the central node is configured to determine a location of the mobile object based on the determined stride length, heading, and separation distance.

2. A method for determining a location of a mobile object including at least a first and second movable part, the method comprising:
   determining distances between a plurality of sensors provided on the first and second movable parts;
   computing a stride length, heading, and separation distance between the first and second movable parts based on the determined distances; and computing a location of the mobile object based on the computed stride length, heading, and separation distance.

3. A computer readable storage medium embodied with program code for enabling a computer to perform a method of determining a location of a mobile object including at least a first and second movable part, the method comprising:
   determining distances between a plurality of sensors provided on the first and second movable parts;
   computing a stride length, heading, and separation distance between the first and second movable parts based on the determined distances; and
   computing a location of the mobile object based on the computed stride length, heading, and separation distance.

4. The system of claim 1, wherein at least one of the stride length, heading, and separation distance is computed using a distance between sensors on the first movable part or the second movable part.

5. The method of claim 2, wherein at least one of the stride length, heading, and separation distance is computed using a distance between sensors on the first movable part or the second movable part.

6. The computer readable storage medium of claim 3, wherein at least one of the stride length, heading, and separation distance is computed using a distance between sensors on the first movable part or the second movable part.

* * * * *